US008271573B2

(12) United States Patent
Song et al.

(10) Patent No.: US 8,271,573 B2
(45) Date of Patent: Sep. 18, 2012

(54) DATA STRUCTURE, EVENT REPORTING SYSTEM AND METHOD FOR EVENT REPORTING

(75) Inventors: Young-Joo Song, Daejon (KR); Jin-Woo Hong, Daejon (KR); Nammee Moon, Seoul (KR); Kyunghee Ji, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1170 days.

(21) Appl. No.: 10/580,290

(22) PCT Filed: Apr. 14, 2004

(86) PCT No.: PCT/KR2004/000872
§ 371 (c)(1),
(2), (4) Date: Apr. 4, 2007

(87) PCT Pub. No.: WO2005/052805
PCT Pub. Date: Jun. 9, 2005

(65) Prior Publication Data
US 2007/0282884 A1    Dec. 6, 2007

(30) Foreign Application Priority Data
Nov. 26, 2003 (KR) ........................ 10-2003-0084742

(51) Int. Cl.
*G06F 15/16* (2006.01)
(52) U.S. Cl. ...................... 709/201; 709/203; 709/236
(58) Field of Classification Search .................. 709/201, 709/203, 236
See application file for complete search history.

(56) References Cited

U.S. PATENT DOCUMENTS

2002/0095429 A1* 7/2002 Song et al. ................. 707/104.1
2003/0018798 A1* 1/2003 Lee et al. .................... 709/231

FOREIGN PATENT DOCUMENTS

| JP | 07-235966 A | 9/1995 |
| JP | 10-512074 T | 11/1998 |
| JP | 2002-324207 A | 11/2002 |
| JP | 2002-373261 A | 12/2002 |
| KR | 2001-0040626 A | 5/2001 |

(Continued)

OTHER PUBLICATIONS

ISO Study Group 16 ISO/IEC/JTC1/SC29/WG11, "Requirements for Event Reporting," Oct. 2003, pp. 1-8.*

(Continued)

*Primary Examiner* — Larry Donaghue
*Assistant Examiner* — Nicholas Taylor
(74) *Attorney, Agent, or Firm* — Ladas & Parry LLP (57) ABSTRACT

Provided is data structure, system and method for reporting an Event occurred due to a digital item (DI). An Event Report Request data for requesting to deliver an Event Report data, wherein the Event Report data reports an Event occurred in accordance with use of a digital item, the Event Report Request data comprising Delivery Time information describing time for transmitting the Event Report data, wherein the Delivery Time information includes: a specific time; an elapsed time; and a periodic time. An Event Report data for reporting an Event occurred in accordance with use of a digital item, wherein the Event Report data provides information specified in an Event Report Request data, the Event Report data comprising: ER Descriptor describing contents and formats of the Event Report data; and Source Descriptor describing information on a source generating the Event Report data.

24 Claims, 10 Drawing Sheets

FOREIGN PATENT DOCUMENTS

| KR | 2001-0082592 A | 8/2001 |
|---|---|---|
| KR | 1020030008354 A | 1/2003 |
| WO | 96/27155 A2 | 9/1996 |
| WO | 00/55889 A1 | 9/2000 |
| WO | 00/72124 A1 | 11/2000 |
| WO | 03/081885 A1 | 10/2003 |

OTHER PUBLICATIONS

ISO Study Group 16 ISO/IEC/JTC1/SC29/WG11, "Current Vision on Event Reporting in MPEG 21," Jul. 2003, pp. 1-6.*

Requirements Group, "Requirements for Event Reporting." Dec. 2003. ISO/IEC JTC1/SC29/WG11 N6279 (*International Organisation for Standardisation / Organisation Internationale De Normalisation*). Coding of Moving Pictures and Audio.

Kyunghee Ji, et al; "MPEG-21 Event Reporting Message Structure based on Digital Data Broadcasting Use Case Scenarios" ITU Study Group 16—Video Coding Experts Group—ISO/IEC MPEG & ITU-T VCEG(ISO/IEC JTC1/SC29/WG11 and ITU-T SG16 Q6), XX, XX, No. M10090, Oct. 14, 2003, XP030038969.

Kyunghee Ji, et al; "Proposed Definition on Delivery Time and Recipient of MPEG-21 Event Reporting", SIT, ETRI International Organisation for Standardisation Organisation Internationale de Normalisation ISO/IEC/JTC1/SC29/WG11 Coding of Moving Pictures and Audio M10619 Mar. 2004, Munich.

Nammee Moon, et al; "Report of CE on Event Reporting Language", ITU Study Group 16—Video Coding Experts Group—ISO/IEC MPEG & ITU-T VCEG(ISO/IEC/JTC/SC/29/WG11 and ITU-T SG16 Q6), XX, XX, No. M9740, Jul. 14, 2003, XP030038635 p. 5-p. 8.

"Preliminary Call for Proposals on Event Reporting", ITU Study Group 16—Video Coding Experts Group—ISO/IEC MPEG & ITU-T VCEG(ISO/IEC JTC1/SC29/WG11 and ITU-T SG16 Q6), XX, XX, No. 5336, Dec. 15, 2002, XP030012606, p. 2, paragraph 5-p. 4, paragraph 6.2.

"Current Vision on Event Reporting in MPEG 21", ITU Study Group 16—Video Coding Experts Group—ISO/IEC MPEG & ITU-T VCEG(ISO/IEC/JTC1/SC29/WG11 and ITU-T SG16 Q6), XX, XX, No. 5871, Jul. 26, 2003 XP 030012952 p. 2 paragraph 3.2, p. 2 paragraph 3.3.1, p. 4-p. 6.

"MPEG-21 Requirements Document", ITU Study Group 16—Video Coding Experts Group—ISO/IEC MPEG & ITU-T VCEG(ISO/IEC/JTC1/SC29/WG11 and ITU-T SG16 Q6), XX, XX, No. 5873, Jul. 26, 2003, XP030012954; p. 4, paragraph 2.2-p. 5, paragraph 3.9, p. 8, paragraph 4.2.5-paragraph 4.4.6.1, p. 22, paragraph 4.4.5.1-paragraph 4.4.6.1, p. 43, line 4.13-p. 46, line 4.13.5.5.

"Requirements for Event Reporting", ITU Study Group 16—Video Coding Experts Group—ISO/IEC MPEG & ITU-T VCEG(ISO/IEC/JTC1/SC29/WG11 and ITU-T SG 16 Q6), XX, XX, No. 6041, Oct. 24, 2003; XP030013048 *p. 2, paragraph 3-p. 3, paragraph 4.2; p. 2, paragraph 3-p. 3, paragraph 4.2; p. 4, paragraph 6; p. 5, paragraph 2.9; p. 6, paragraph 2.13-paragraph 2.20; p. 7, paragraph 3.10.

USPTO OA mailed Oct. 14, 2010 in connection with U.S. Appl. No. 10/580,480.

European Search Report: EP 04 81 9503.

International Search Report: PCT/KR2004/003089.

Gabriele Spenger, et al; "MPEG-21—What does it bring to Audio?", Audio Engineering Society Convention Paper 5462 Presented at the 111th Convention Sep. 21-24, 2001, New York, NY, USA, 8 pages.

Young-Joo Song, et al; "MPEG-21 Event Reporting Message Structure based on digital data broadcasting use case scenarios", The Korean Society of Broadcast Engineers, vol. 8, No. 4, pp. 399-409, Aug. 4, 2003.

Multimedia Framework; "(MPEG-21)," ISO/TC46/SC9 (ISO/IEC TR18034-1:2001(E), N297, Sep. 30, 2000, 69 pages.

* cited by examiner

FIG. 2

| General Element | Specific Element | | |
|---|---|---|---|
| Condition Descriptor | Time | | |
| | Event | DI Related Operation | |
| | | Peer Related Operation | |
| ERR Descriptor | Description | Time Stamp | |
| | | Life Time | |
| | | History | |
| | | Priority Level | |
| | ID | | |
| | Access Right | | |
| ER Descriptor | ER Data Descriptor | ER ID | |
| | | Report Data | Peer Data |
| | | | User Data |
| | ERR | | |
| Delivery Descriptor | Format | | |
| | Encryprion | | |
| | Access Right | | |
| | Authentication | | |
| | Delivery Time | | |
| | Protocol | | |
| | Compression | | |
| To Whom | Peer IDs | | |
| | User IDs | | |

| General Element | Specific Element | |
|---|---|---|
| Condition Descriptor | Time | |
| | DI Related Operation | |
| | Peer Related Operation | |
| ERR Descriptor | Description | Time Stamp |
| | | Life Time |
| | | History |
| | | Priority Level |
| | ID | |
| | Access Right | |
| ER Descriptor | ER Data Descriptor | ER ID |
| | | Report Data |
| | | Access Right |
| | | Format |
| | ERR | |
| Delivery Descriptor | To Whom | Peer IDs |
| | | User IDs |
| | Delivery Time | |
| | How | Encyprion |
| | | Authentication |
| | | Protocol |
| | | Compression |

FIG. 5

| General Element | Specific Element |
|---|---|
| ER Descriptor | ID |
| | Format |
| | Encryprion |
| | Access Right |
| | Authentication |
| | Compression |
| | History |
| | Priority Level |
| | Time Stamp |
| Source Descriptor | ER Peer ID |
| | Original ERR |
| ER Report Data | |
| Additional Action Descriptor | ERR |
| | ER |

DATA STRUCTURE, EVENT REPORTING SYSTEM AND METHOD FOR EVENT REPORTING

TECHNICAL FIELD

The present invention relates to data structure, system and method for reporting an Event occurred due to a digital item (DI); and more particularly, the present invention relates to data structures of Event Report Request (ER-R) data and Event Report (ER) data, an Event Reporting system for managing and processing the Event based on the ER-R data and the ER data, a method for reporting the Event, and a computer readable medium storing instructions for implementing the same method.

BACKGROUND ART

Moving picture expert group (MPEG) proposed 'Event Reporting' due to a new standard working item of MPEG-21, a digital item. Referring to definitions of MPEG-21, the digital item means a structured digital object with a standard representation, identification and metadata. The Event Reporting means a process of Event monitoring, which requests a report on a certain Event occurred during the digital item is used in user terminal, and reports occurrence of the Event. The user includes all of a provider, an authorizer, a distributor and a consumer of the digital item.

MPEG-21 includes seven core elements, i.e., Digital Item Declaration (DID), Digital Item Identification and Description (DII&D), Content Handling and Usage, Intellectual Property Management and Protection (IPMP), Terminal & Network, Content Representation and Event Reporting.

An object of the Event Reporting is to provide a standardized interface for measuring and reporting the Event occurred when using the digital item of MPEG-21 in direct or indirect. The Event Reporting is applied to usage report, e.g., Performance and Copies of the digital item, and technical report, e.g., Bandwidth Usage/Availability, Network Congestion, Load Balancing, and a financial report, e.g., Proof of Purchase, License Purchase and Delivery.

Accordingly, the Event Reporting increases understanding user's action, provides generation, delivery and consumption of the digital item, and enables the user to manage circulation of the copyrighted material by reporting the Event related to royalties and finances.

The Event Reporting is classified into Event Report Requests and Event Reports.

The Event Report Request means a process in which an Event Report Request data, which is preferred to be generated as metadata, requesting a report for a certain Event occurred in accordance to use of a digital item is generated and transmitted.

The Event Report means a process in which that an Event Report data, which is preferred to be generated as metadata, containing report data is generated and transmitted, when an Event specified in the Event Report Request data occurs.

Accordingly, the Event Reporting system should include an apparatus which generates Event Report Request data in response to a request of a user and transmits the same, and an apparatus which receives, analyzes and stores the Event Report Request data, monitors the Event, generates Event Report data corresponding to the Event, and transmits the same.

The Event Reporting system needs to have standardized data structures of the Event Report Request data and the Event Report data.

However, in the conventional system, there is no apparatus for reporting the Event occurred from usage of the digital item, data structures of Event Report Request data and the Event Report data are not standardized. Therefore, there is a problem that the Event Reporting can not be applied.

DISCLOSURE OF THE INVENTION

It is, therefore, an object of the present invention to provide data structures of an Event Report Request data and an Event Report data for reporting an Event occurred due to a digital item (DI).

It is, therefore, another object of the present invention to provide an Event Reporting system for processing the Event based on the Event Report Request data and the Event Report data, a method for reporting the Event, and a computer readable medium storing instructions for implementing the same method.

In accordance with an embodiment of the present invention, there is provided an Event Report Request data for requesting to deliver an Event Report data, wherein the Event Report data reports an Event occurred in accordance with use of a digital item, the Event Report Request data comprising Delivery Time information describing time for transmitting the Event Report data, wherein the Delivery Time information includes: a specific time; an elapsed time; and a periodic time.

In accordance with an embodiment of the present invention, there is provided an Event Report data for reporting an Event occurred in accordance with use of a digital item, wherein the Event Report data provides information specified in an Event Report Request data, the Event Report data comprising: ER Descriptor describing contents and formats of the Event Report data; and Source Descriptor describing information on a source generating the Event Report data.

In accordance with an embodiment of the present invention, there is provided an Event Reporting system for processing an Event Report data in order to report an Event occurred in accordance with use of a digital item, the Event Report system comprising: Event Report Request processing means for generating and delivering an Event Report Request data requesting to report an Event in response to user's request; and Event Report processing means for generating and delivering an Event Report data reporting the Event specified in the Event Report Request data.

In accordance with an embodiment of the present invention, there is provided an apparatus for requesting to report an Event and processing an Event Report Request data in order to report an Event occurred in accordance with use of a digital item, the apparatus comprising: Event Report Request generation means for generating the Event Report Request data; Event Report Request transmission means for transmitting the Event Report Request data; Event Report Request receiving means for receiving an Event Report Request data; Event Report Request analysis means for the Event Report Request data received in the Event Report Request receiving means; and Event occurrence monitoring means for monitoring whether or not an Event occurs.

In accordance with an embodiment of the present invention, there is provided an apparatus for processing an Event Report data in order to report an Event occurred in accordance with use of a digital item, the apparatus comprising: Event Report generation means for generating the Event Report data; Event Report transmission means for transmitting the Event Report data; Event Report receiving means for receiving an Event Report data; and Event Report Request analysis means for the Event Report data received in the Event Report receiving means.

In accordance with an embodiment of the present invention, there is provided a method for requesting to report an Event and processing an Event Report Request data in order to report an Event occurred in accordance with use of a digital item, the method comprising steps of: a) generating and delivering the Event Report Request data; and b) receiving an Event Report Request data from an outside, analyzing the Event Report Request data received from the outside and monitoring whether or not an Event specified in the Event Report Request data received from the outside occurs.

In accordance with an embodiment of the present invention, there is provided a method for requesting to report an Event and processing an Event Report Request data in order to report an Event occurred in accordance with use of a digital item, the method comprising steps of: a) generating and delivering the Event Report Request data; and b) receiving an Event Report Request data from an outside, analyzing the Event Report Request data received from the outside and monitoring whether or not an Event specified in the Event Report Request data received from the outside occurs.

In accordance with an embodiment of the present invention, there is provided a computer readable recording media storing instructions for executing a method for requesting to report an Event and processing an Event Report Request data in order to report an Event occurred in accordance with use of a digital item, the method comprising steps of: a) generating and delivering the Event Report Request data; and b) receiving an Event Report Request data from an outside, analyzing the Event Report Request data received from the outside and monitoring whether or not an Event specified in the Event Report Request data received from the outside occurs.

MODES FOR THE INVENTION

The above and other objects and features of the present invention will become apparent from the following description and thereby one of ordinary skill in the art can embody the principles of the present invention and invent various apparatuses within the concept and scope of the present invention. For easy and clear description, the same reference numeral is assigned to the identical elements, though the elements are illustrated in a different drawing. Hereafter, preferred embodiments of the present invention will be described in detail with reference to the drawings.

Figure 1:
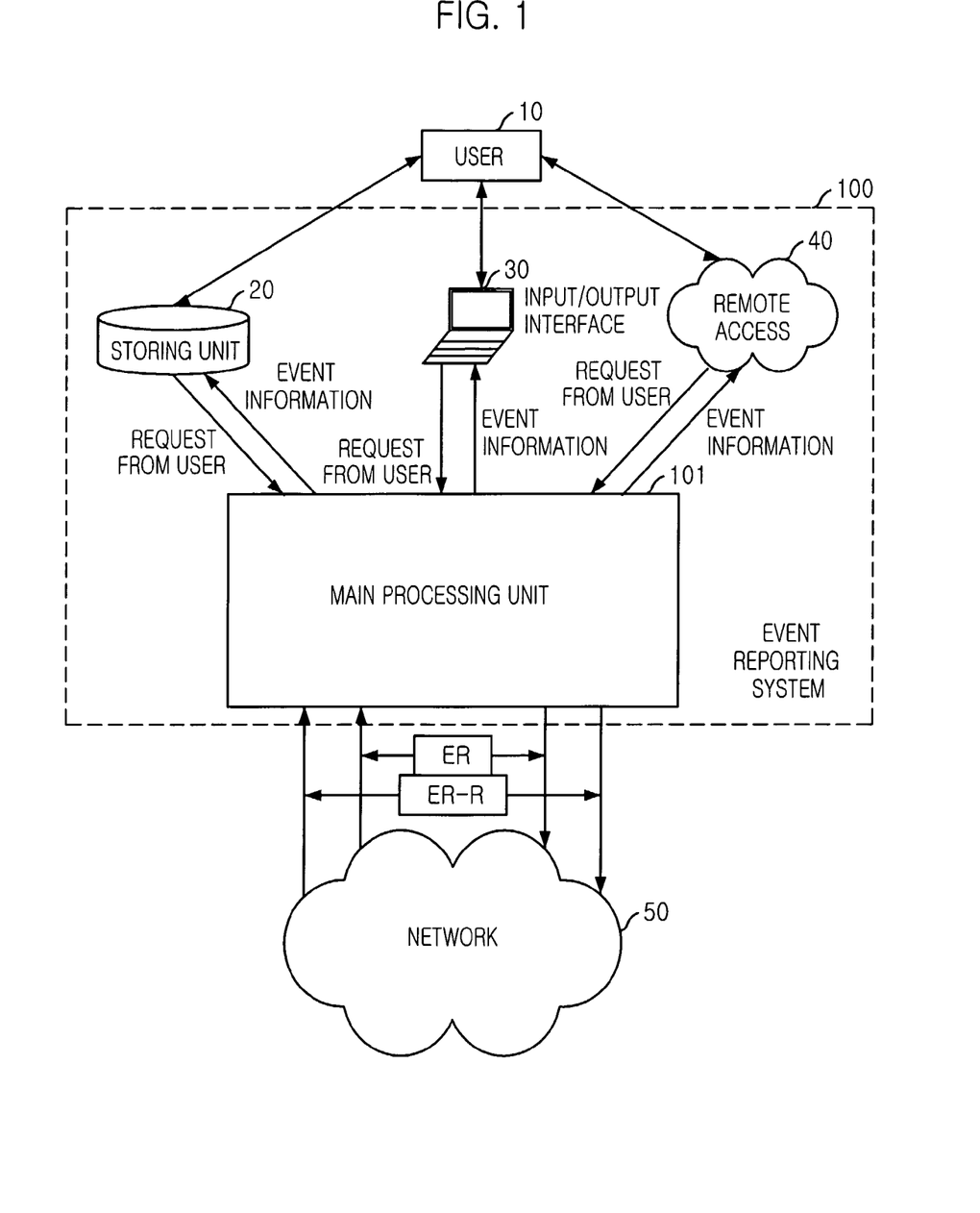
FIG. 1 is a block diagram showing an Event Reporting system in accordance with the present invention.

FIG. 1 is a block diagram showing an Event Reporting system in accordance with the present invention.

As shown, a main processing unit 101, which processes Event Reporting in an Event Reporting system 100, communicates with a user 10 in direct through an input/output interface 30, through a file stored on a storing unit 20 or through a remote access 40. The Event Reporting system transmits and receives to/from other user in outside, Event Report data (ER) or Event Report Request data (ER-R) through a network 50.

Herein, the Event Report Request (ER-R) is information describing what to report, to whom to report, a form of report, when and how to report, when an Event is generated with respect to a digital item. Further description on it will be provided later.

The Event Report (ER) data describes information on the Event requested by the ER-R data, a user requesting the Event Reporting, and a recipient receiving the ER data, which will be described in detail.

The Event Reporting system 100 can be installed on all of systems generating, transmitting and consuming a digital item, for example, a computer including a laptop computer, a notebook computer, a desktop computer, a workstation and a mainframe, and a mobile terminal including a personal digital assistant (PDA) and a mobile station.

The user 10 accesses the Event Reporting system 100 and requests to generate the Event Report Request (ER-R) data through a direct input process based on an application program.

Also, the user 10 requests the Event Reporting system 100 to generate the ER-R data by storing contents on the storing unit 20 in advance.

The storing unit 20 can be located in inside or outside of the Event Reporting system 100, and includes all kinds of computer readable recording medium, e.g., a CD-ROM, a random access memory (RAM), a read only memory (ROM), a floppy disk, a hard disk and a magneto-optical disk.

Also, the user 10 accesses the Event Reporting system 100 in remote and requests the Event Reporting system 100 to generate the ER-R data.

The Event Reporting system 100 receives a request to generate the ER-R data from the user 10, generates the ER-R data and transmits the ER-R data to the user through a network 50.

The network 50 includes wired/wireless local area networks (LAN), e.g., Ethernet, a fiber distributed data interface (FDDI) network, a token ring network and an asynchronous transfer mode (ATM) network, and a wide area network, e.g., a public switched telephone network (PSTN), a packet switched data network (PSDN) and an integrated services digital network (ISDN).

Also, the Event Reporting system 100 receives the ER data and the ER-R data through the network 50, analyzes them, generates another ER data or another ER-R data and transmits them to an outside, extracts information from the ER data and the ER-R data, stores the extracted information or transmits the extracted information to user application program in direct.

Figure 2:
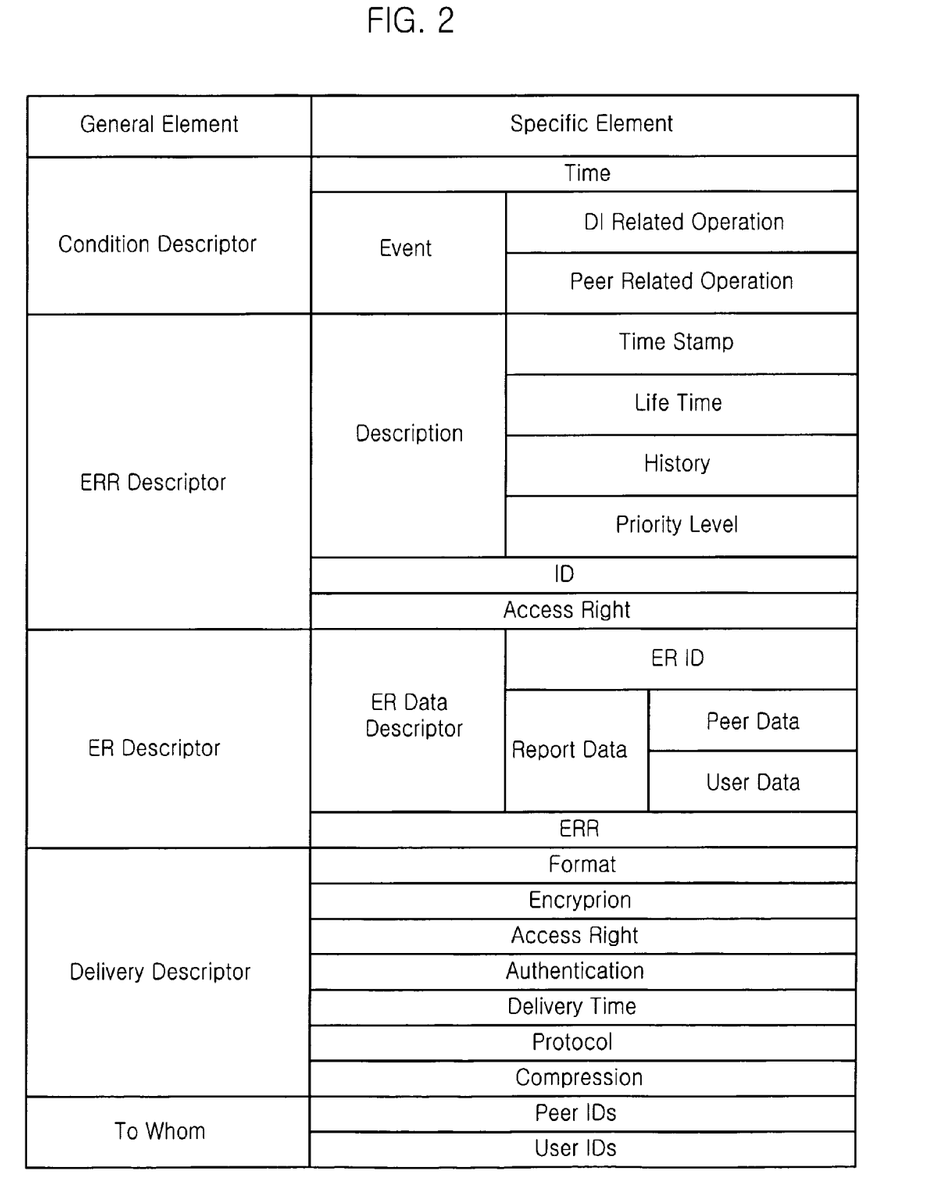
FIG. 2 is a diagram showing data structure of Event Report Request data-in accordance with an embodiment of the present invention.

FIG. 2 is a diagram showing data structure of an Event Report Request data in accordance with an embodiment of the present invention.

As shown, the Event Report Request (ER-R) data includes a "Condition Descriptor" field, an "Event Report Request (ERR) Descriptor" field, an "Event Report (ER) Descriptor" field, a "Delivery Descriptor" field and "To Whom" field.

In detail, the ER-R data includes a "Condition Descriptor" describing conditions for the delivery of the ER data, i.e., occurrence of an Event, an "ERR Descriptor" describing identification and characteristics of the ER-R data itself, an "ER Descriptor" describing contents and formats of the ER data corresponding to the Event condition, a "Delivery Descriptor" describing generation and transmission schemes of the ER data, and "To Whom" field describing recipients of the ER data.

The "Condition Descriptor" includes "Time" field describing the Event occurrence time, "DI Related Operation" field describing user operation condition in accordance with the use of the digital item, "Peer Related Operation" field describing condition in accordance with the operations occurred in the peer.

The peer means a device or application that compliantly processes the digital item without modification.

The "Time" describes a specific time, an elapsed time or a periodic time, on which the Event occurs.

The "DI Related Operation" may use terms of right data dictionary (RDD) defined in MPEG-21, e.g., DI play, stop, modify, install, uninstall, print, adapt, delete, execute and move.

The "Peer Related Operation" may use terms of the Peer Environment of a Digital Item Adaptation (DIA) defined in the MPEG-21, e.g., network congestion and peer capability.

The "ERR Descriptor" includes an "ID" field describing identification (ID) of the ER-R data, a "Description" field of the ER-R data describing attributes of the ER-R data, and an "Access Right" field describing an access right of the ER-R data.

The "Description" information includes a "Time Stamp" field describing a time on which the ER-R data is generated, a "Life Time" field describing a life time of the ER-R data, a "History" field describing a history of creation or modification of the ER-R data and a "Priority Level" field describing the priority level to the ER-R data, wherein the priority level is used by peers to handle ER-R data.

The "ID" may have the same format as digital item identification (DII) defined in the MPEG-21, and the "Life Time" may be described as a time to live (TTL).

The "ER Descriptor" includes an "ER Data Descriptor" field describing a report data list and format of the Event Report (ER) data, wherein the report data list is a list of information to be included in the ER data, and an "ERR" field describing another Event Report Request message data requesting an operation, e.g., an acknowledgement or forwarding of the ER-R data.

The "ER Data Descriptor" includes an "ER ID" field describing identification of an ER data and a "Report Data" field describing list of information which the Event Report data reports.

The "ER ID" may have the same format as the DII defined in the MPEG-21.

The "Report Data" includes a "Peer Data" field describing information on the peer and a "User Data" field describing information on the user.

The "Delivery Descriptor" includes a "Format" field describing a format of data used for generating the ER data, an "Encryption" field describing an encryption method for encrypting the ER data, an "Access right" field describing access right to the ER data, an "Authentication" field describing an authentication method for authenticating the ER data, a "Delivery time" field describing time to delivery the ER data, a "Protocol" field describing a network protocol for delivering the ER data and a "Compression" field describing a compression method for compressing the Event Report data.

The "Delivery Time" includes a specific time, an elapsed time and a periodic time on which the Event Report data is delivered.

Figure 3:
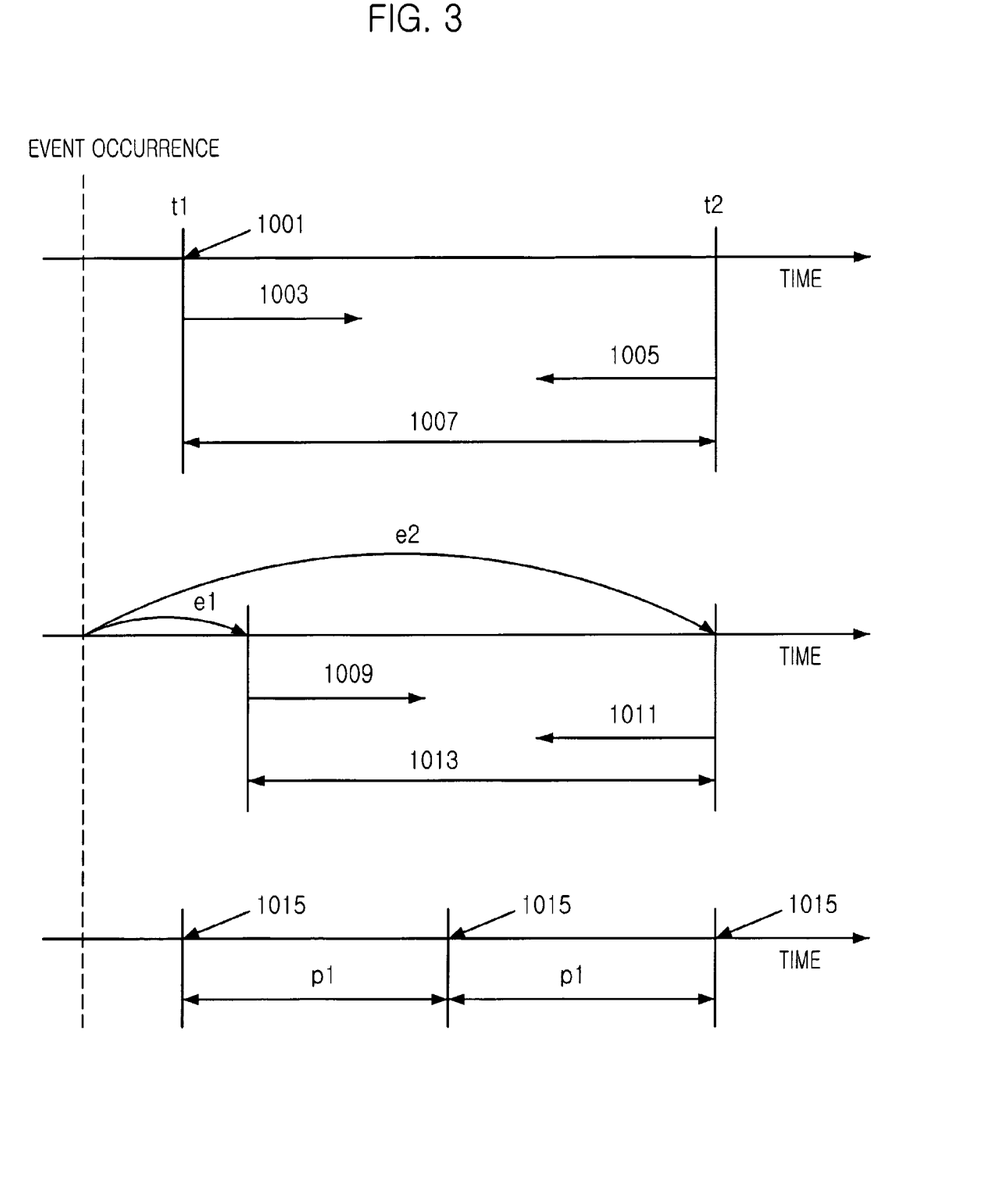
FIG. 3 is a diagram showing contents of delivery time information of Event Report Request data in accordance with an embodiment of the present invention.

FIG. 3 is a diagram showing contents of delivery time information of Event Report Request data in accordance with an embodiment of the present invention.

As shown, the "Delivery Time" may request to deliver the Event Report data on a time t1 (see 1001), before a time t2 (see 1005) and between t1 and t2 (see 1007).

The "Delivery Time" may request to deliver the Event Report data after a time e1 based on Event occurrence (see 1009), before a time e2 (see 1011) and between e1 and e2 (time subtracted from e2 by e1) (see 1013).

Also, the "Delivery Time" may request to deliver the Event Report data at every time corresponding to a transmission period p1 (see 1015).

According to schema of extensible Markup Language, hereinafter referred to as XML, syntax of Delivery Time information is defined as Table 1.

TABLE 1

```
<xsd:complexType name="DeliveryTime">
    <xsd:choice minOccurs="0">
        <xsd:element name="specificTime" type="SpecificTime"/>
        <xsd:element name="elapsedTime" type="ElapsedTime"/>
        <xsd:element name="periodicTime" type="PeriodicTime"/>
    </xsd:choice>
</xsd:complexType>
<xsd:complexType name="SpecificTime">
    <xsd:choice>
        <xsd:element name="onTime" type="xsd:dateTime"/>
        <xsd:sequence>
            <xsd:element name="afterOn" type="xsd:dateTime" minOccurs="0"/>
            <xsd:element name="beforeOn" type="xsd:dateTime" minOccurs="0"/>
        </xsd:sequence>
    </xsd:choice>
</xsd:complexType>
<xsd:complexType name="ElapsedTime">
    <xsd:sequence>
        <xsd:element name="beginElapse" type="BeginElapse" minOccurs="0"/>
        <xsd:element name="endElapse" type="EndElapse" minOccurs="0"/>
    </xsd:sequence>
</xsd:complexType>
```

TABLE 1-continued

```
<xsd:complexType name="BeginElapse">
    <xsd:choice>
        <xsd:element name="sTime" type="xsd:time"/>
        <xsd:element name="sDuration" type="xsd:duration"/>
    </xsd:choice>
</xsd:complexType>
<xsd:complexType name="EndElapse">
    <xsd:choice>
        <xsd:element name="eTime" type="xsd:time"/>
        <xsd:element name="eDuration" type="xsd:duration"/>
    </xsd:choice>
</xsd:complexType>
<xsd:complexType name="PeriodicTime">
    <xsd:sequence>
        <xsd:element name="start" type="xsd:dateTime" minOccurs="0"/>
        <xsd:element name="period" type="xsd:duration"/>
        <xsd:element name="phase" type="xsd:duration" minOccurs="0"/>
        <xsd:element name="duration" type="xsd:duration"/>
        <xsd:element name="periodCount" type="xsd:duration"/>
    </xsd:sequence>
</xsd:complexType>
<xsd:element name="deliveryTime" type="DeliveryTime"/>
```

Then semantics of the Delivery Time information used in XML Syntax are described in Table 2.

TABLE 2

| Name | Definition |
|---|---|
| "DeliveryTime" | Delivery Time Information |
| "SpecificTime" | Specific time to transmit ER data |
| "ElapsedTime" | Elapsed time to transmit ER data |
| "PeriodicTime" | Periodic Time to transmit ER data |
| "onTime" | Time at which ER data should be transmitted |
| "afterOn" | After a time at which ER data should be transmitted |
| "beforeOn" | Before a time at which ER data should be transmitted |
| "beginElapse" | Reference time when elapsed time for transmitting the ER data begins. If there is no beginElapse, the reference time is Event occurrence time |
| "endElapse" | End time of elapsed time by which delivery of the Event Report data is ended |
| "sTime" | Specific time of a day on which an Event occurs, the specific time at which delivery of an Event Report data for the Event starts |
| "sDuration" | Duration after specific time of a day on which an Event occurs, the specific time at which delivery of an Event Report data for the Event starts |
| "eTime" | Specific time of a day on which an Event occurs, the specific time at which delivery of an Event Report data for the Event ends |
| "endDuration" | Duration after specific time of a day on which an Event occurs, the specific time at which delivery of an Event Report data for the Event ends |

Tables 3 to 5 show an example of Delivery Time information defined by XML syntax.

TABLE 3

```
<deliveryTime>
    <specificTime>
        <beforeOn>2004-03-31T00:00:00</deforeOn>
    </specificTime>
</deliveryTime>
```

TABLE 4

```
<deliveryTime>
    <elapsedTime>
        <beginElapse>
            <sTime>00:00:00</sTime>
        </beginElapse>
        <endElapse>
            <eDuration>PT1H</eDuration>
        </endElapse>
    </elapsedTime>
</deliveryTime>
```

TABLE 5

```
<deliveryTime>
    <periodicTime>
        <start>2004-01-01T00:00:00</start>
        <period>P1M</period>
        <duration>P1H</duration>
    </periodicTime>
</deliveryTime>
```

Here, XML syntax of Delivery Time information is applied to Event occurrence time information of Condition Descriptor.

The "To Whom" includes a "Peer IDs" field, which is identification information of the peers receiving the Event Report data, and a "User IDs" field, which is identification information of the users receiving the Event Report data.

The "To Whom" may be multiple recipients, and the recipients may be classified as mandatory recipients and optional recipients.

Here, XML syntax of "To Whom" information is defined as a following table 6.

TABLE 6

```
<xsd:complexType name="Recipient">
    <xsd:sequence minOccurs="1" maxOccurs="unbounded">
        <xsd:element name="peer" type="xsd:string"/>
        <xsd:element name="reportPolicy">
            <xsd:simpleType>
                <xsd:restriction base="xsd:NMTOKEN">
                    <xsd:pattern value="required"/>
                    <xsd:pattern value="optional"/>
                </xsd:restriction>
            </xsd:simpleType>
        </xsd:element>
    </xsd:sequence>
</xsd:complexType>
<xsd:element name="recipient" type="Recipient"/>
```

Here, semantics of principal parameters used in the XML syntax of "To Whom" are defined as following table 7.

TABLE 7

| Name | Definition |
| --- | --- |
| "Recipient" | Recipient |
| "peer" | Peer generating Event Report |
| "reportPolicy" | Event Report policy. If the value is "required", the peer should transmit the ER data, and if the value is "optional", the Event Report Request message is denied and the ER data can not be transmitted. |

Table 8 shows an example of "Recipient" defined by XML syntax in the table 7.

TABLE 8

```
<recipient>
    <peer>Peer1</peer>
    <reportPolicy>required</reportPolicy>
    <peer>Peer2</peer>
    <reportPolicy>optional</reportPolicy>
</recipient>
```

Figure 4:
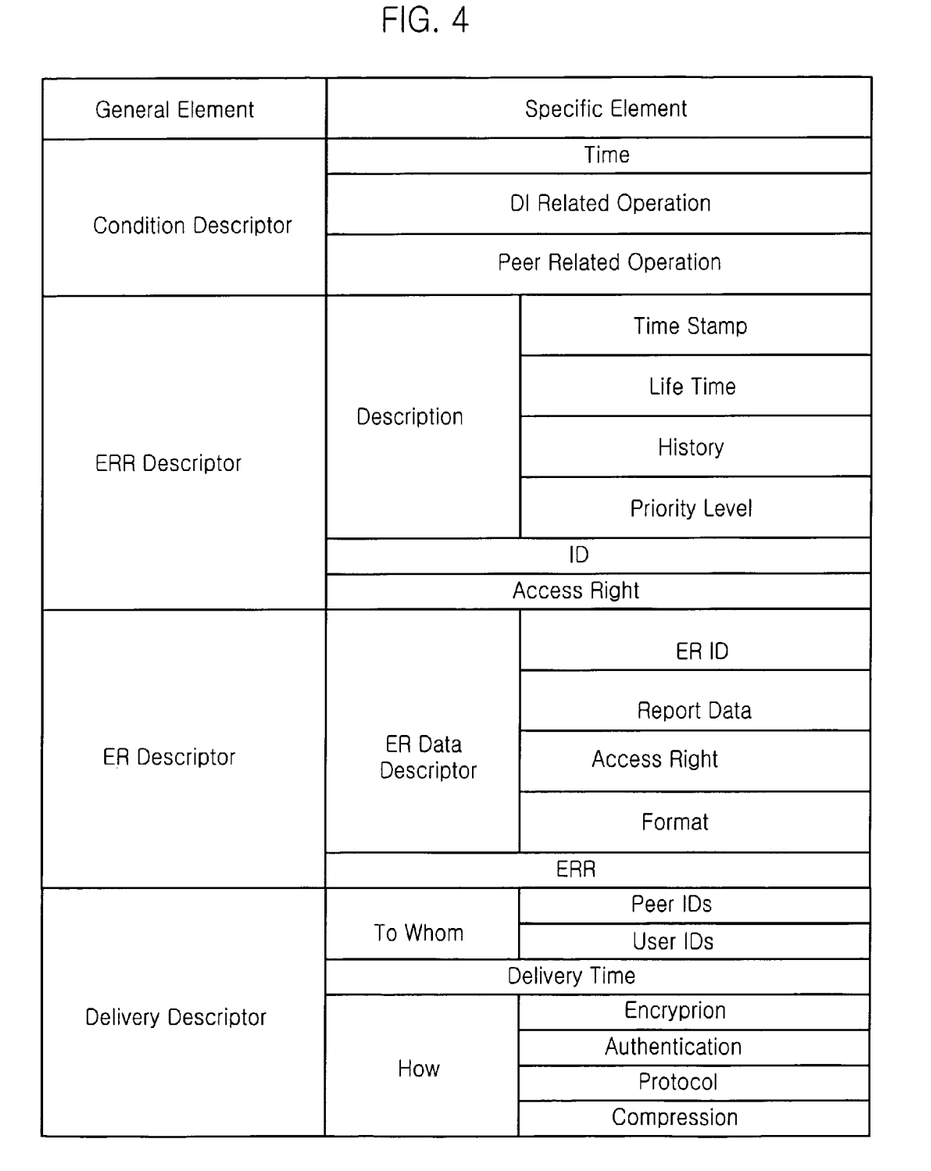
FIG. 4 is a diagram showing data structure of Event Report Request data in accordance with another embodiment of the present invention.

FIG. 4 is a diagram showing data structure of Event Report Request data in accordance with another embodiment of the present invention.

As shown, the data structure of Event Report Request data in accordance with a second embodiment includes a "Condition Descriptor" field, an "ERR Descriptor" field, an "ER Descriptor" field and a "Delivery Descriptor" field. "To Whom" field is included as a specific element of the "Delivery Descriptor", which is different from the ER-R data in accordance with the first embodiment.

An "Access Right" and "Format" fields are included in not the "Delivery Descriptor" but "ER Data Descriptor" field of the "ER Descriptor".

Specific elements of the "Condition Descriptor" and "ERR Descriptor" are identical to those of the ER-R data of the first embodiment.

It is apparent that the means of the elements of the ER-R data of the second embodiment are identical to those of the ER-R data of the first embodiment.

Figure 5:
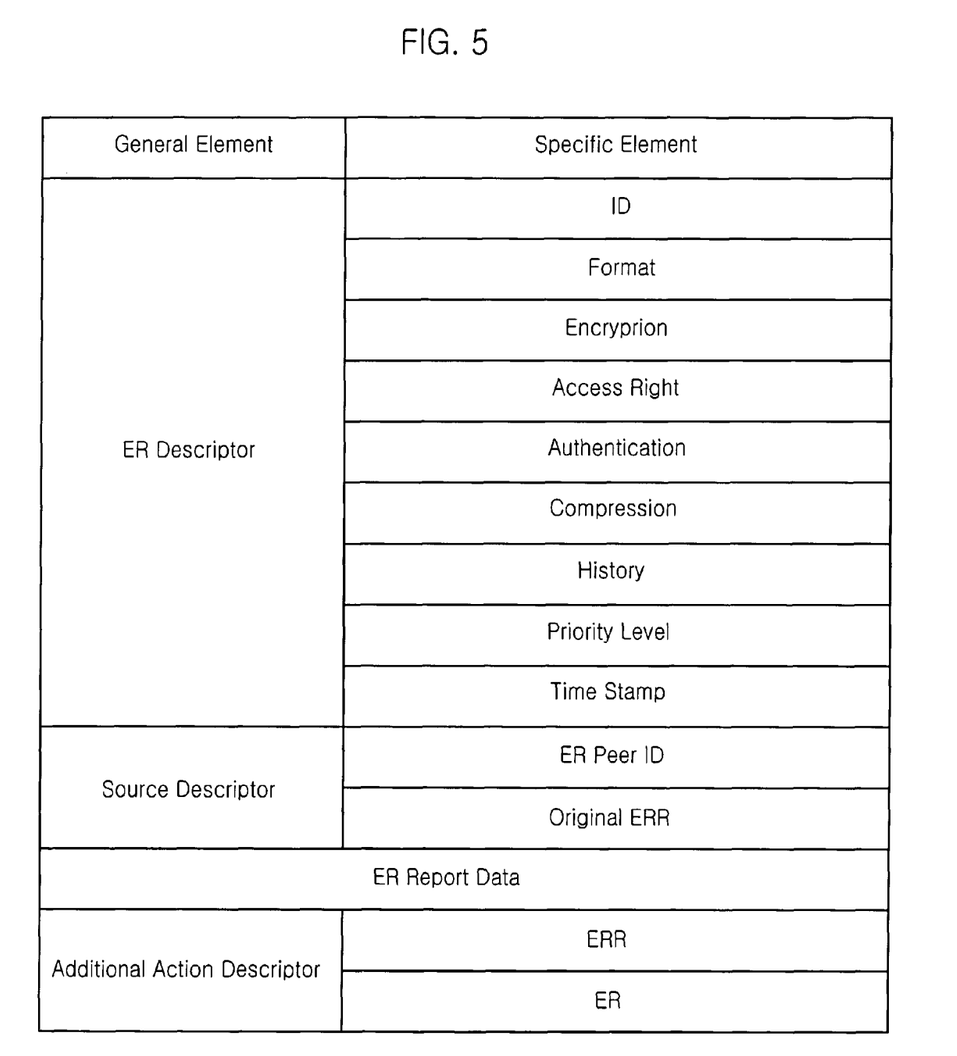
FIG. 5 is a diagram showing data structure of Event Report data in accordance with another embodiment of the present invention.

FIG. 5 is a diagram showing data structure of Event Report data in accordance with an embodiment of the present invention.

As shown, the Event Report (ER) data includes an "ER Descriptor" field describing contents and formats of the ER data, a "Source Descriptor" field describing information on a source generating the Event Report message, an "ER Report data" field describing reportable information corresponding to items requested by the ER-R data, and an "Additional Action Descriptor" field describing additional actions related to generation, transmission and reception of the ER data corresponding to the ER-R data.

The "ER Descriptor" includes identification (ID) of the ER data and description information of the ER data. The ER descriptor further includes an "ER Status" field describing status of the ER data, which is an optional element.

The description information includes a "Format" field describing a format of Event Report information data, an "Encryption" field describing an encryption algorithm for encrypting the ER data, an "Access Right" field describing an access right of the ER data, an "Authentication" field describing an authentication method for authenticating the ER data, a "Compression" field describing a compression method for compressing the ER data, a "History" field describing a history of creation or modification of the ER data, a "Priority Level" field describing the priority level to the ER data, wherein the priority level is used by the recipient to handle ER data, and a "Time Stamp" field describing a timing information on which the ER data is generated.

The "Source Descriptor" includes an "ER Peer ID" field describing identification (ID) of the peer who generates the ER data at the first, and an "Original ERR" field describing information on the ER-R data requesting to generate the ER data.

The "ERR" field may describe the ER-R data requesting to generate the ER data as an embedded whole ERR message data or a reference other ERR data.

The "ER Report Data" may allow the reportable information to be linked to the ER data as an embedded data or a reference data.

The "Additional Action Descriptor" includes an "ERR" field describing another Event Report Request data requesting an operation, e.g., an acknowledgement, forwarding or merging of the ER data, and an "ER" field describing another Event Report data to be linked to the ER data.

Accordingly, the "Additional Action Descriptor" allows the ER data to include another ER-R data or another ER data, and process recursive Event Report or Event Report Request.

The "ERR" may describe the ER-R data requesting an acknowledgement or forwarding or merging of the ER data as an embedded data or a reference data.

The "ER Report Data" may allow another Event Report data related to the ER data as an embedded data or a reference data.

Figure 6:
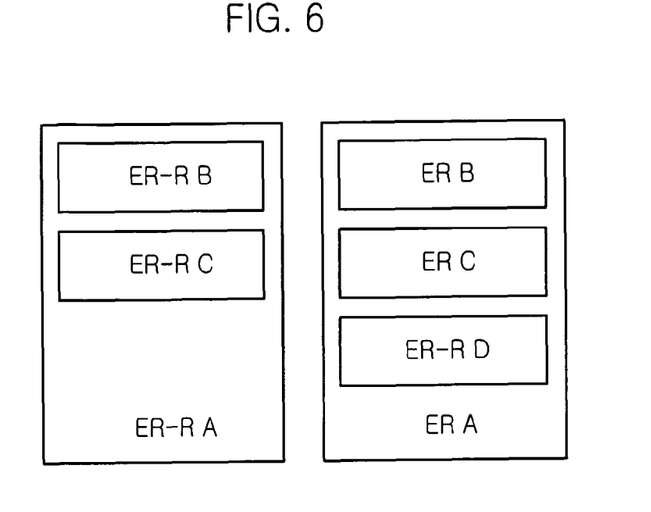
FIG. 6 is a diagram showing Event Report Request data including other Event Report Request data and Event Report data including other Event Report data and another Event Report Request data in accordance with an embodiment of the present invention.

FIG. 6 is a diagram showing Event Report Request data including other Event Report Request data and Event Report data including other Event Report data and another Event Report Request data in accordance with an embodiment of the present invention.

As shown, the ER data may include one or more other Event Report data or Event Report Request data an embedded data or a reference data.

As shown, an Event Report Request (ER-R) data ER-R A may include other ER-R data ER-R B, ER-R C as a reference data or an embedded data based on the "ERR" of the "ER Descriptor".

Also, the ER data ER A corresponding to the ER-R data ER-R A may include another ER-R data ER-R D as well as ER data ER B, ER C corresponding to ER-R data ER-R B, ER-R C based on the "Additional Action Descriptor".

Accordingly, using the Event Reporting system and the Event Report data in accordance with the present invention, recursive Event Reporting and Event Report Request can be implemented.

Figure 7:
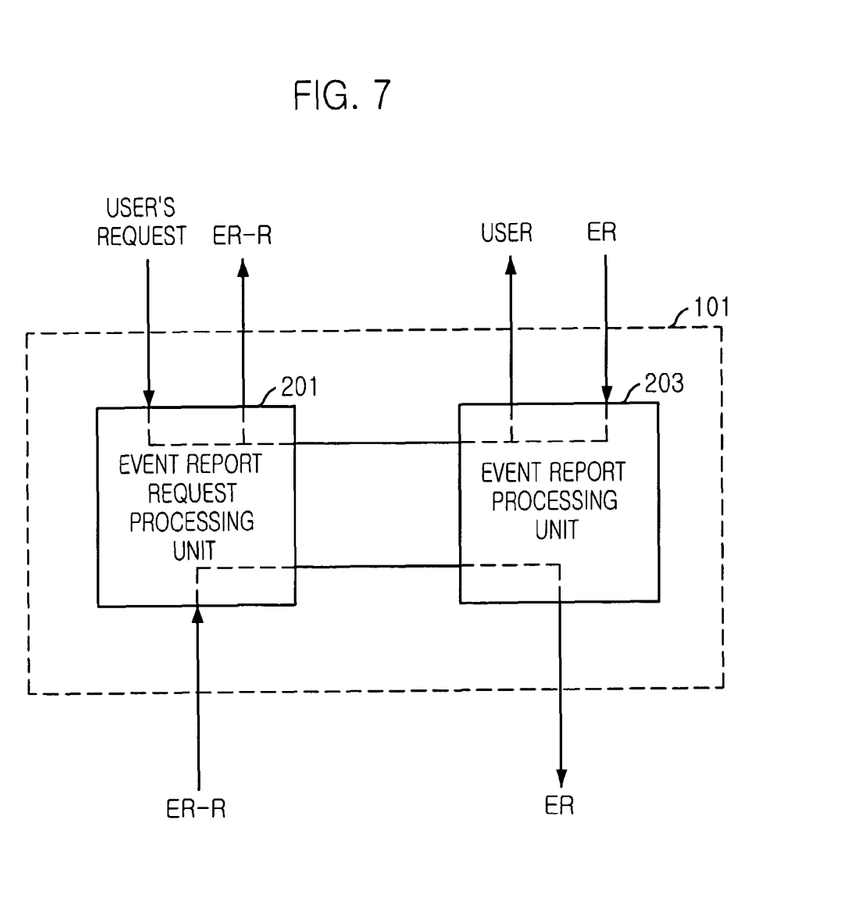
FIG. 7 is a detailed block diagram showing a main processing unit of an Event Reporting system in accordance with the present invention.

FIG. 7 is a detailed block diagram showing a main processing unit 101 of an Event Reporting system in accordance with the present invention.

As shown, the main processing unit 101 includes an Event Report Request (ER-R) processing unit 201 and an Event Report (ER) processing unit 203.

The Event Report Request processing unit 201 receives from a user a request to report an Event, generates an Event Report Request (ER-R) data requesting to report the Event to be occurred when a digital item is used, and transmits the ER-R data to the user.

The Event Report Request processing unit 201 analyzes the ER-R data received from an outside, monitors whether or not the Event specified in the ER-R data occurs, and requests the Event Report processing unit 203 to generate an Event Report (ER) data when the Event specified in the ER-R data occurs.

The Event Report processing unit 203 generates an Event Report (ER) data requested by the Event Report Request processing unit 201, transmits the ER data to the user. The Event Report processing unit 203 analyzes an ER data received from the outside, extracts contents of the ER data and transmits the contents of the ER data to the user.

It is apparent to one skilled in the art that the Event Report Request processing unit 201 and the Event Report processing unit 203 may be independently implemented and operated in different devices (peer).

Figure 8:
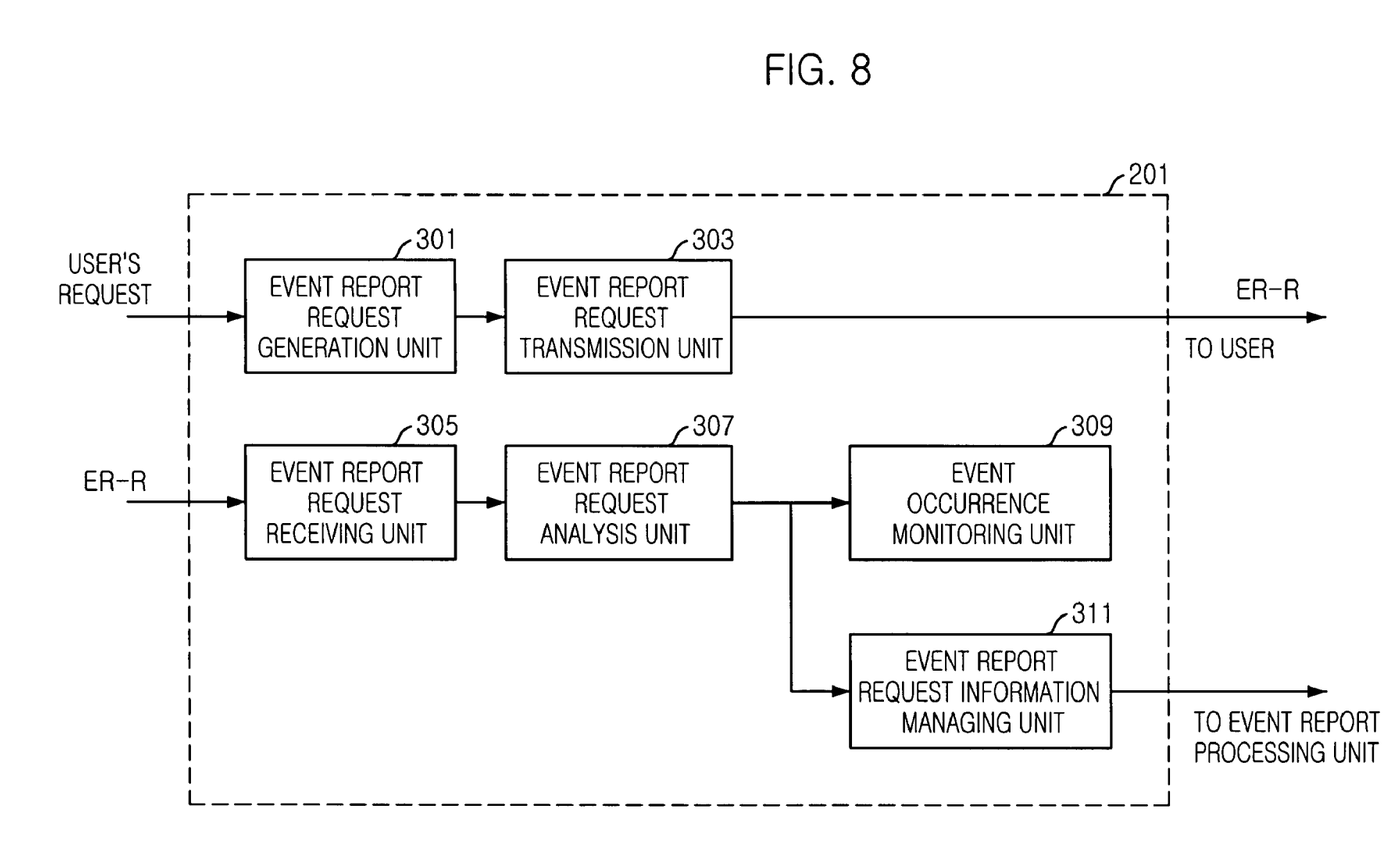
FIG. 8 is a detailed block diagram showing an Event Report Request processing unit of an Event Reporting system in accordance with the present invention.

FIG. 8 is a detailed block diagram showing an Event Report Request processing unit of an Event Reporting system in accordance with the present invention;

As shown, the Event Report Request processing unit 201 includes an Event Report Request generation unit 301, an Event Report Request transmission unit 303, an Event Report Request receiving unit 305, an Event Report Request analysis unit 307, an Event occurrence monitoring unit 309 and an Event Report Request information managing unit 311.

The Event Report Request generation unit 301 generates the ER-R data in accordance with the request of the user.

The Event Report Request transmission unit 303 transmits the ER-R data generated in the Event Report Request generation unit 301 to the recipient.

The Event Report Request transmission unit 303 is made by a protocol stack for a network resource and attaches a protocol header to the ER-R data generated in the Event Report Request generation unit 301 and transmits the ER-R data.

The ER-R data and the ER data may be transmitted through on a commonly used protocol, e.g., a transmission control protocol (TCP), a user datagram protocol (UDP), a hyper-text transfer protocol (HTTP), a simple object access protocol (SOAP), or through a new protocol developed for the Event Reporting.

The Event Report Request receiving unit 305 is a network module which receives the ER-R data from an outside and analyzes a network header of the ER-R data. If the ER data is transmitted to itself, the Event Report Request receiving unit 305 transmits the ER-R data to the Event Report Request analysis unit 307, and if not, the Event Report Request receiving unit 305 transmits the ER-R data to a network route for the recipient of the ER-R data.

The Event Report Request analysis unit 307 analyzes the ER-R data received from the outside, transmits to the Event occurrence monitoring unit 309 information on whether an Event Report is requested when a certain Event occurs with respect to a certain digital item, and transmits to the Event Report Request information managing unit 311 the information on what information to report, to whom to report, a format of the report, when to report and how to report.

The Event occurrence monitoring unit 309 monitors whether or not it occurs the Event for the digital item specified in the ER-R data.

For example, the ER-R data requesting to report an Event when the digital item is played, the Event occurrence monitoring unit 309 monitors whether or not the digital item specified in the ER-R data is played, and when starting to play the digital item, informs occurrence of the Event to the Event Report Request information managing unit 311 to generate an ER data.

The Event Report Request information managing unit 311 is a database storing the information received from the Event Report Request analysis unit 307. If the occurrence of the Event is informed from the Event occurrence monitoring unit 309, the Event Report Request information managing unit 311 determines time on which the ER data should be generated based on the stored ERR information, and transmits the information to the Event Report processing unit 203 so that the ER data is generated on the specific time or between the times.

Figure 9:
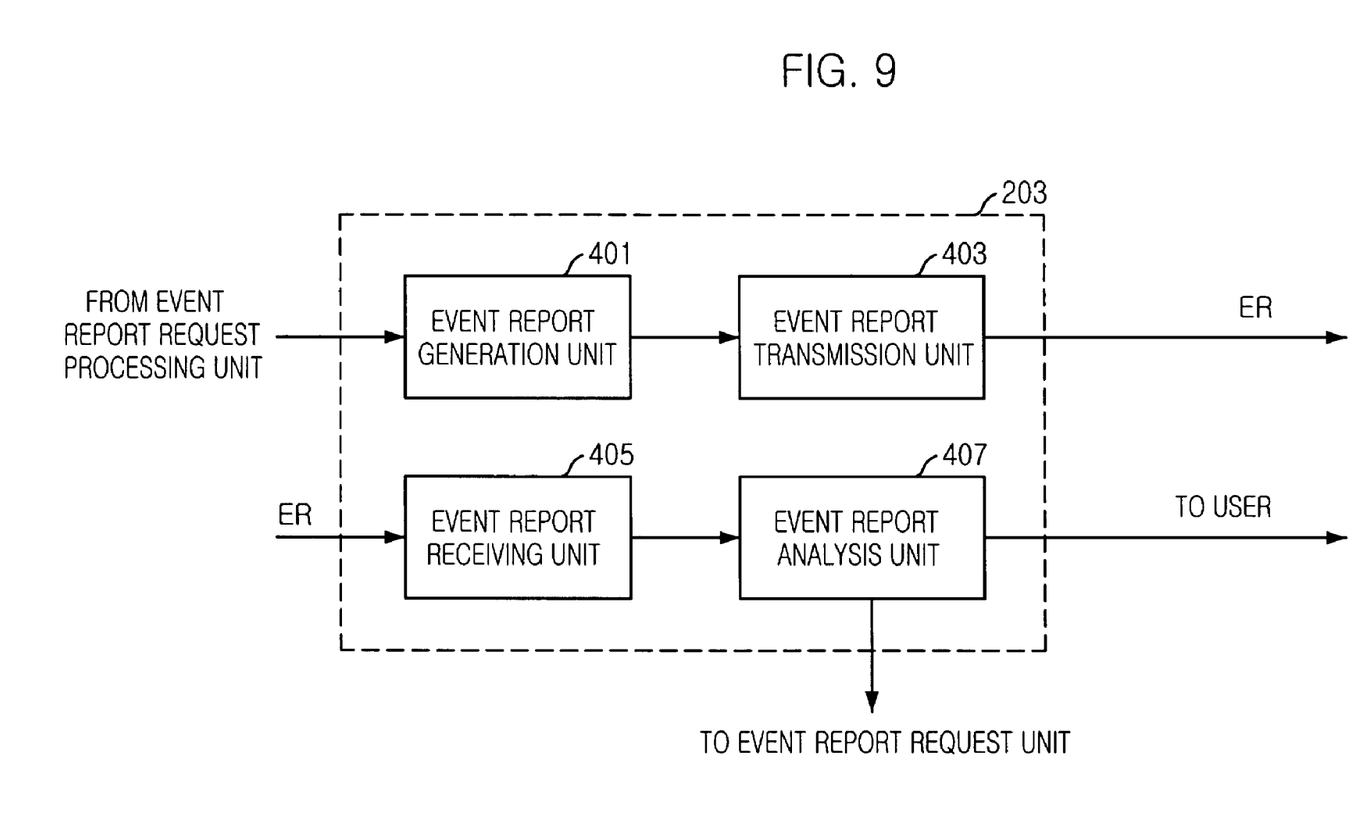
FIG. 9 is a detailed block diagram showing an Event Report processing unit of an Event Reporting system in accordance with the present invention.

FIG. 9 is a detailed block diagram showing an Event Report processing unit of an Event Reporting system in accordance with the present invention.

As shown, the Event Report processing unit includes an Event Report generation unit 401, an Event Report transmission unit 403, an Event Report receiving unit 405 and an Event Report analysis unit 407.

The Event Report generation unit 401 generates Event Report (ER) data in response to request to generate the ER data from the Event request information managing unit 313.

The Event Report transmission unit 403 transmits the ER data generated in the Event Report generation unit 401 to the user.

The Event Report transmission unit 403 is made by a protocol stack for a network resource and is a network module which attaches a protocol header to the ER data generated in the Event Report generation unit 401 and transmits the ER data through an actual network resource.

The Event Report receiving unit 405 is a network module which receives the ER data from an outside and analyzes a network header of the ER data. If the ER data is transmitted to itself, the Event Report receiving unit 405 transmits the ER data to the Event Report analysis unit 407, and if not, the Event Report receiving unit 405 transmits the ER data to a network route for the recipient of the ER data.

The Event Report analysis unit 407 analyzes the ER data received from the outside, extracts information on what Event occurs for what digital item from the ER data, and transmits the information to the user. If the ER data includes Event Report Request (ER-R) data, the Event Report analysis unit 407 transmits the ER-R data to the Event Report Request processing unit 201.

Figure 10:
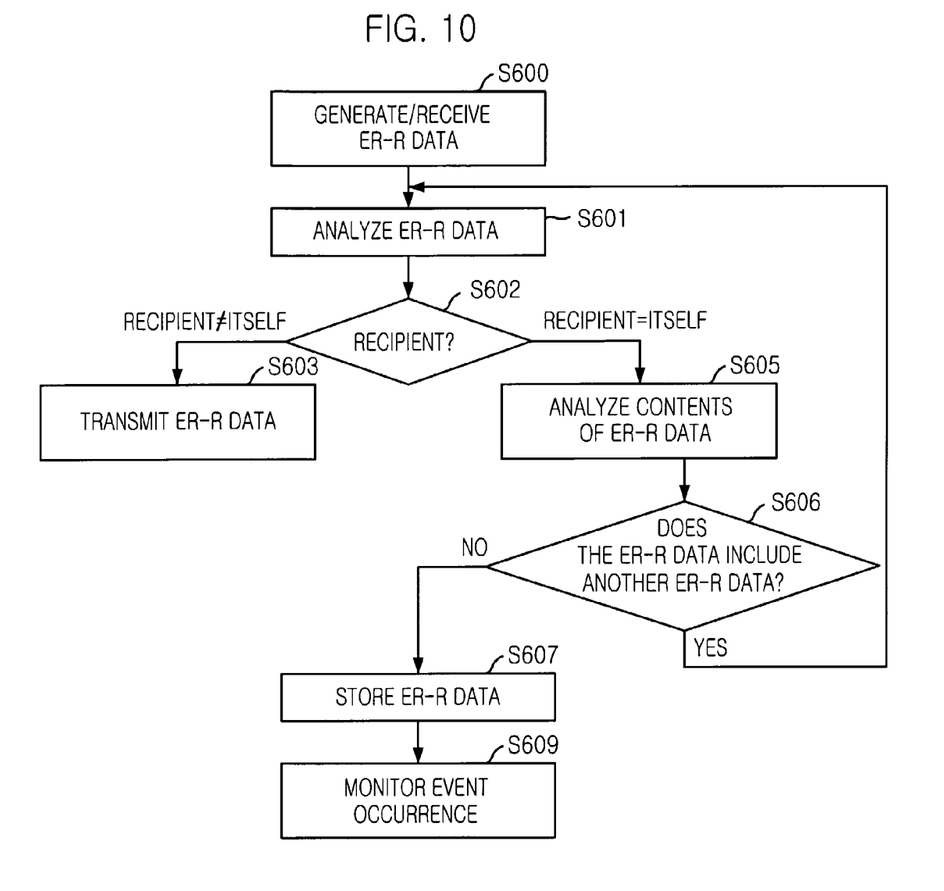
FIG. 10 is a flow chart showing an Event Report Requesting process.

FIG. 10 is a flow chart showing an Event Report Requesting process.

First, the Event Report Request processing unit 201 generates ER-R data or receives ER-R data from an outside at step S600.

The Event Report Request processing unit 201 analyzes the ER-R data at step S601 and checks the recipient of the ER-R data at step S602.

If the recipient is not itself, at step S603, the ER-R data is transmitted to a network route for the recipient of the ER-R data.

If the recipient is itself, the Event Report Request processing unit 201 analyzes contents of the ER-R data at step S605, and determines whether the ER-R data includes another ER-R data at step S606.

If the ER-R data includes another ER-R data, the process continues to the step S601, to process another ER-R data.

If the ER-R data does not include other ER-R data, the Event Report Request processing unit 201 stores the ER-R data at step S607, and monitors whether it occurs an Event corresponding to the ER-R data at step S609.

Figure 11:
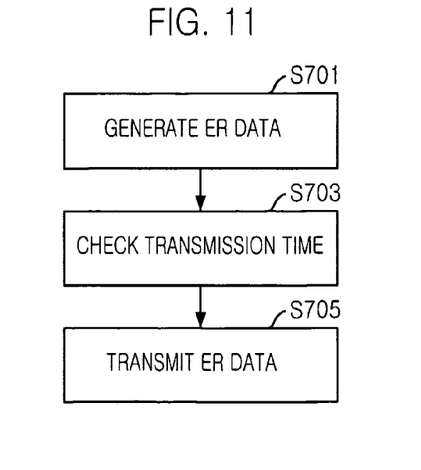
FIG. 11 is a flow chart showing an Event Reporting process.

FIG. 11 is a flow chart showing an Event Report process.

If a reportable Event occurs, a generation of an Event Report (ER) data is requested and the ER data is generated at step S701.

A "Delivery Time" specified in the ER-R data is checked at step S703 and the ER data is delivered to the user on the delivery time at step S705.

Figure 12:
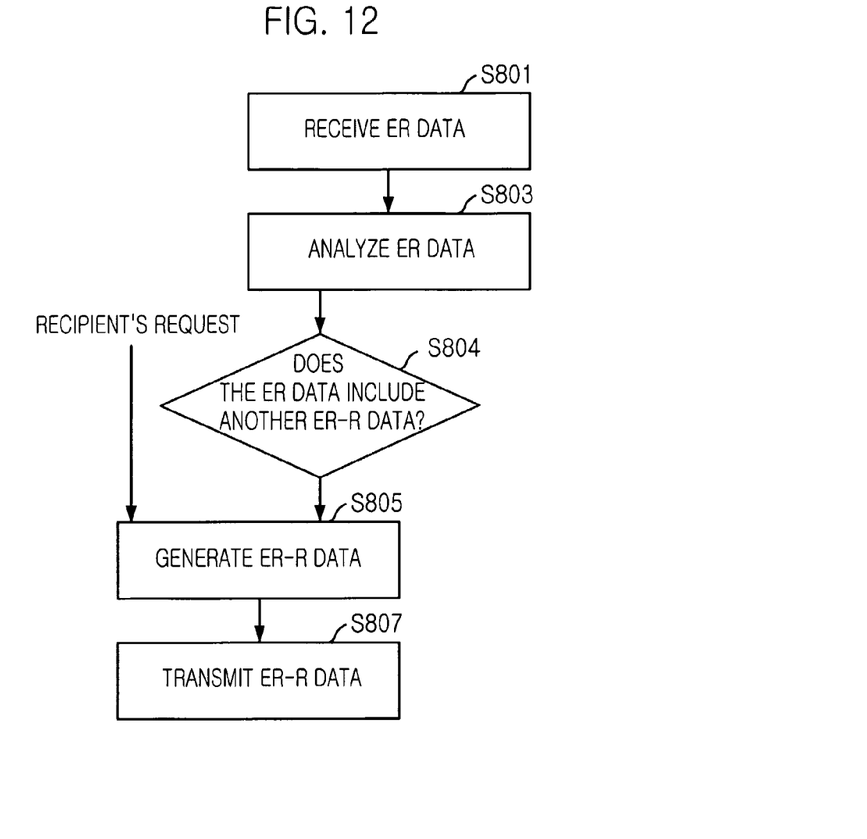
FIG. 12 is a flow chart showing an Event Report processing process.

FIG. 12 is a flow chart showing an Event Report processing process.

The ER data is received from the outside at step S801, contents of the ER data is analyzed at step S803, and it is determined whether or not the ER data includes another ER-R data at step S804.

If the ER data includes another ER-R data or a request to report an Event is received from the user, the ER-R data is generated and transmitted at steps S805 and S807.

Figure 13:
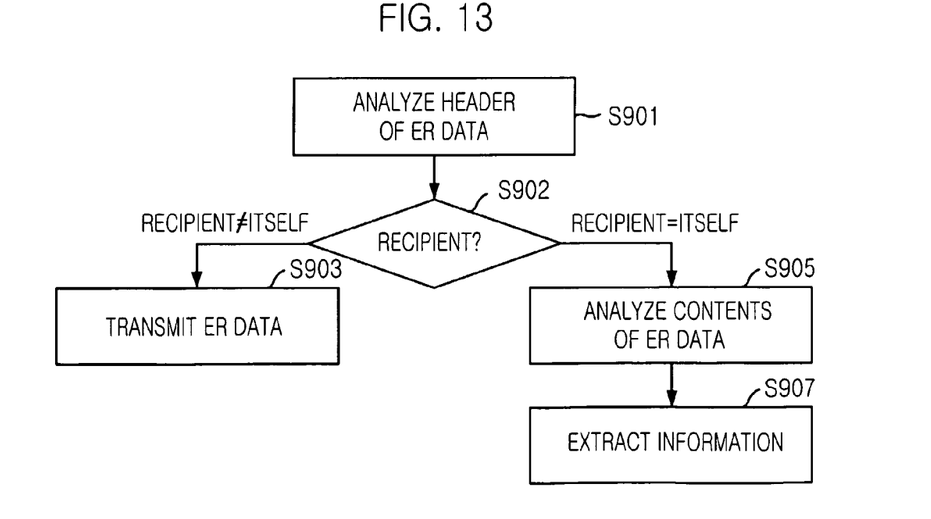
FIG. 13 is a flow chart showing an Event Report data analyzing process.

FIG. 13 is a flow chart showing an Event Report data analyzing process.

First, a header of the ER data is analyzed at step S901, and the recipient of the ER data is checked at step S902.

If the recipient is not itself, at step S903, the ER data is transmitted to a network route for the recipient of the ER data.

If the recipient is itself, contents of the ER data is analyzed at step S905, extracts information from the ER data and transmits the information to the user at step S909.

The present invention can be implemented and stored in a computer readable recording medium, e.g., CD-ROM, a random access memory (RAM), a read only memory (ROM), a floppy disk, a hard disk, and a magneto-optical disk.

While the present invention has been described with respect to certain preferred embodiments, it will be apparent to those skilled in the art that various changes and modifications may be made without departing from the scope of the invention as defined in the following claims.

What is claimed is:

1. An apparatus for requesting a report on an event for an Event Reporting on the event that occurs in accordance with use of a digital item having a first data structure based on Moving Picture expert group (MPEG) from a standard item of MPEG-21, the apparatus comprising:
a processor;
an Event Report Request (ERR) generation means for generating an ERR data in response to at least one of a user's request and a received ERR data, the user's request and the received ERR data requesting an Event Report (ER) data for the Event Reporting;
an ERR transmission means for transmitting the ERR data generated in the ERR generation means;
an ERR receiving means for receiving the ERR data; and
an ERR analyzing means for analyzing the ERR data received in the ERR receiving means,
wherein the ERR data includes a following second data structure:
ERR descriptor information describing characteristics of the ERR data;
first ER descriptor information describing characteristics of ER data generated based on the ERR data; and
condition descriptor information describing conditions of occurrence of the event,
wherein the ER data includes a following third data structure:
second ER descriptor information describing characteristics of the ER data;
Original ERR information describing ERR data requesting to generate the ER data; and
payload information including reporting information of the ER data,
wherein the ER data further includes ERR information describing information on another ERR data included in the ER data, and
wherein each of the usage of the digital item having the first data structure, the ERR generation means having the second data structure means, and the ER data having the third data structure represents a standardized data structure of metadata, which is mutually compatible for each of the digital item, the ERR generation means, and the ER data.

2. The apparatus as recited in claim 1, wherein the ERR descriptor information includes life time information describing a life time of the ERR data.

3. The apparatus as recited in claim 1, wherein the ERR descriptor information includes history information describing a history of creation or modification of the ERR data.

4. The apparatus as recited in claim 1, wherein the ERR descriptor information includes priority level information describing priority level for processing the ERR data.

5. The apparatus as recited in claim 1, wherein the first ER descriptor information includes identification information of the ER data.

6. The apparatus as recited in claim 1, wherein the first ER descriptor information includes ER access control information describing information on a peer or a user that can access to the ER data.

7. The apparatus as recited in claim 1, wherein the first ER descriptor information includes ER format information describing information on a format of the ER data.

8. The apparatus as recited in claim 1, wherein the first ER descriptor information includes at least one of identification information of a peer and identification information of a user, the peer and the user generating the ER data.

9. The apparatus as recited in claim 1, wherein the first ER descriptor information includes delivery parameter information describing information on delivery of the ER data.

10. The apparatus as recited in claim 1, wherein the Condition descriptor information includes time condition information describing occurrence time of the event.

11. The apparatus as recited in claim 1, wherein the Condition descriptor information includes condition information other than time condition information describing occurrence time of the event.

12. The apparatus as recited in claim 1, wherein the second ER descriptor information includes source information describing information on generation of the ER data.

13. An apparatus for processing a report on an event for an Event Reporting on the event that occurs in accordance with use of a digital item having a first data structure based on Moving Picture expert group (MPEG) from a standard item of MPEG-21, the apparatus comprising:
a processor;
a monitoring means for monitoring whether or not the event occurs;
an ER generation means for generating an Event Report (ER) data for an event report corresponding to an Event Report Request(ERR) data requesting the report on the event; and
an ER transmission means for transmitting the ER data generated in the ER generation means,
wherein the ERR data includes a following second data structure:
ERR descriptor information describing characteristics of the ERR data;
first ER descriptor information describing characteristics of ER data generated based on the ERR data; and
condition descriptor information describing conditions of occurrence of an event, wherein the ER data includes a following third data structure:
second ER descriptor information describing characteristics of the ER data;
Original ERR information describing ERR data requesting to generate the ER data; and payload information including reporting information of the ER data, wherein the ER data further includes ERR information describing information on another ERR data included in the ER data, and wherein each of the usage of the digital item having the first data structure, the ERR generation means having the second data structure means, and the ER data having the third data structure represents a standardized data structure of metadata, which is mutually compatible for each of the digital item, the ERR generation means, and the ER data.

14. The apparatus as recited in claim 13, wherein the ERR descriptor information includes life time information describing a life time of the ERR data.

15. The apparatus as recited in claim 13, wherein the ERR descriptor information includes history information describing a history of creation or modification of the ERR data.

16. The apparatus as recited in claim 13, wherein the ERR descriptor information includes priority level information describing priority level for processing the ERR data.

17. The apparatus as recited in claim 13, wherein the first ER descriptor information includes identification information of the ER data.

18. The apparatus as recited in claim 13, wherein the first ER descriptor information includes ER access control information describing information on a peer or a user that can access to the ER data.

19. The apparatus as recited in claim 13, wherein the first ER descriptor information includes ER format information describing information on a format of the ER data.

20. The apparatus as recited in claim 13, wherein the first ER descriptor information includes at least one of identification information of a peer and identification information of a user, the peer and the user generating the ER data.

21. The apparatus as recited in claim 13, wherein the first ER descriptor information includes delivery parameter information describing information on delivery of the ER data.

22. The apparatus as recited in claim 13, wherein the Condition descriptor information includes time condition information describing occurrence time of the event.

23. The apparatus as recited in claim 13, wherein the Condition descriptor information includes condition information other than time condition information describing occurrence time of the event.

24. The apparatus as recited in claim 13, wherein the second ER descriptor information includes source information describing information on generation of the ER data.

* * * * *